United States Patent
Goh et al.

(10) Patent No.: US 8,108,508 B1
(45) Date of Patent: Jan. 31, 2012

(54) WEB SERVER CHIP FOR NETWORK MANAGEABILITY

(75) Inventors: Dave Goh, Mountain View, CA (US); Leena Sansguiri, Palo Alto, CA (US); Paul Chou, Los Altos, CA (US); Nandakumar Natarajan, Sunnyvale, CA (US); John A. Dilley, Los Altos, CA (US); Marcos Frid, San Carlos, CA (US); Robert H. Hyerle, Bernin (FR); Arne Luhrs, Los Altos, CA (US); Chandrasekar Venkatraman, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1826 days.

(21) Appl. No.: 09/102,207

(22) Filed: Jun. 22, 1998

(51) Int. Cl.
*G06F 15/173* (2006.01)

(52) U.S. Cl. ........................................................ 709/224

(58) Field of Classification Search .................. 709/224, 709/223, 250; 370/463; 720/224, 223, 250
See application file for complete search history.

(56) References Cited

U.S. PATENT DOCUMENTS

| 5,386,568 | A | * | 1/1995 | Wold et al. | 395/700 |
| 5,410,706 | A | * | 4/1995 | Farrand et al. | 713/2 |
| 5,903,737 | A | * | 5/1999 | Han | 395/280 |
| 5,978,578 | A | * | 11/1999 | Azarya et al. | 395/701 |
| 6,400,715 | B1 | * | 6/2002 | Beaudoin et al. | 370/392 |
| 6,532,497 | B1 | * | 3/2003 | Cromer et al. | 709/250 |

* cited by examiner

*Primary Examiner* — David D Davis

(57) ABSTRACT

A network device includes a web server chip that is connectable to a computer network. The web server chip includes an embedded processor that is programmable to function as a manageability web server, obtain manageability information about the network device and send the manageability to a network manager. The web server chip further includes an interface for communicating with an I²C bus in the network device. The embedded processor is programmable to obtain manageability information about devices connected to the I²C bus. The embedded processor is also programmable to control fan controllers, power supply controllers and other controllers connected to the I²C bus. This, in turn, allows a network manager to command the web server chip to remotely power up and power down the network device. Thus, the web server chip can perform network management functions without burdening the host processor of the network device. If network communications are performed via HTTP, the embedded processor can be programmed to implement an HTTP server, and the network manger can use a web browser and HTML files to run network management software.

30 Claims, 6 Drawing Sheets

WEB SERVER CHIP FOR NETWORK MANAGEABILITY

BACKGROUND OF THE INVENTION

The present invention relates generally to computers. More specifically, the present invention relates to network management of computers.

Network management typically includes monitoring and controlling resources in computers, resources used in connection with computers, and resources used for communication between computers. The resources might include computer components (e.g., storage devices, processors, printers), computer software (e.g., operating systems, application software, data communication software), connectivity and interconnection components (e.g., routers, modems), and physical media and connections (e.g., network adapter cards). Typical goals of network management include reducing system and network down time, increasing response time to network problems, reducing network bottlenecks, and reducing network operational costs.

However, software for performing the network management can be expensive to purchase and maintain. For a centralized network management architecture, the network management software includes a network manager program, which instructs a network manager to remotely access and monitor the resources, build and maintain a management information base (a collection of objects that represent the resources and provide information about the resources), and make information about the resources accessible to human network administrators. The network management software also includes agents, which allow the network manager to remotely monitor and control the resources on the network. The agents respond to requests for information from the network manager, respond to requests for actions from the network manager, and provide unsolicited information to the network manager.

The agents give rise to another cost of performing network management: the use of precious computational resources. Managed computers, for example, run the agents. Yet when a managed computer runs the agent, its host processor is being burdened, and overhead is being added to its operating system.

There are other costs associated with network management. For instance, a managed computer could use more than one physical interface to the network. A first network card typically provides an interface for a LAN controller or other type of network controller, and a second network card typically provides an additional interface for the network management. The additional interface adds to the cost of each computer on the network and, therefore, adds to the overall cost of implementing the network management system.

Moreover, certain operational costs are typically not addressed by network management systems. One such network operational cost is the cost of leaving a computer on while it is not being used. In many workplaces, networked computers are left on after business hours. The computers are also left on during lunch breaks, business meetings and other activities. An employee might take a vacation, but his computer might be left on. Even though a computer is not being used, it is still consuming power. Therefore, electricity and money are being wasted.

Additionally, most network systems do not perform certain types of maintenance and diagnostics that could further lower the operational costs. Take an example in which the operating system of a managed computer crashes. If the operating system crashes, the computer cannot run its agent. Therefore, the agent cannot take images of memory and diagnose the cause of the crash. Consequently, the network manager and system administrator cannot gather information about that computer and determine why it crashed. Making such information available could lower the cost of servicing the computer.

Take another example in which the BIOS of the managed computer must be upgraded. The typical network management system does not automatically perform such a firmware upgrade. Instead, a computer technician is called in. This technical support is not provided for free. In fact, it can be rather expensive.

There is a need to lower the operational costs of network management. There is also a need to lower the cost of implementing the network management.

SUMMARY OF THE INVENTION

The present invention can be regarded as a web server chip for a network device. The web server chip includes a media access controller connectable to a computer network; a host interface connectable to a host processor of the network device; and an embedded processor coupled between the host interface and the media access controller. The embedded processor is programmable to function as a manageability web server, communicate with the host interface and obtain manageability information about the network device. The embedded processor is also programmable to send the manageability information to the media access controller for transmission over the computer network. Thus, the web server chip can perform network management functions without burdening the host processor.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
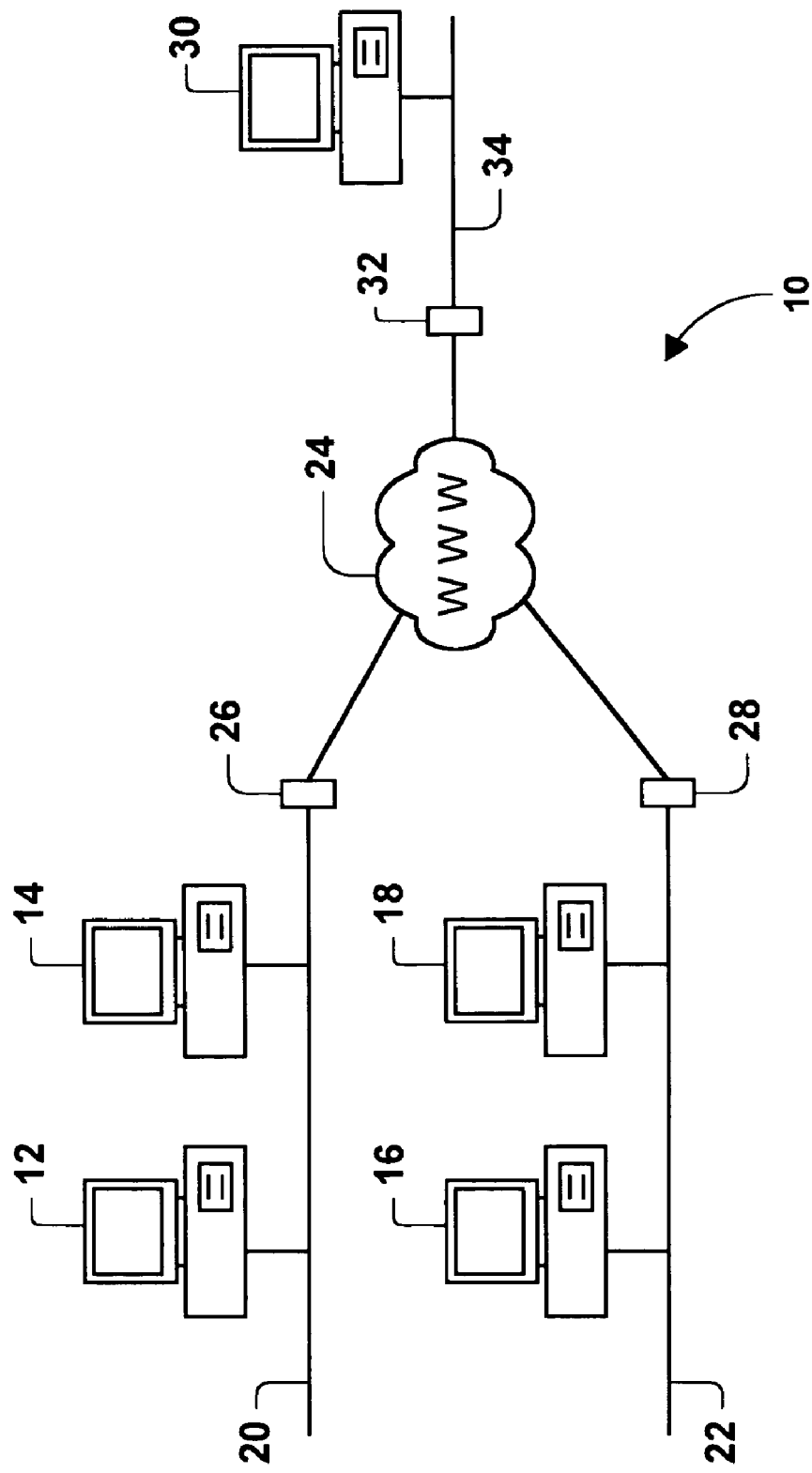
FIG. 1 is a schematic diagram of a centralized network management system.

As shown in the drawings for purposes of illustration, the invention is embodied in a managed computer. The managed computer includes a chip that functions as a web server. The chip gathers information about other resources in the managed computer without burdening the host processor and placing overhead on the operating system. The chip also allows a network manager to have access to the information, even if the computer crashes. A managed computer including the chip can be reconfigured remotely, its BIOS and other firmware can be upgraded remotely, and it can be remotely powered up and down during periods of inactivity. Moreover, the chip allows network management and local area network communications to be performed over a single physical interface.

FIG. 1 shows a system 10 including a plurality of managed computers 12, 14, 16 and 18 that are connected to a computer network. The network can include anything from the Internet to a local area network ("LAN"). The physical and link layers of the computer network can include Ethernet, Token Ring and any other physical and link layer. The network layer can include Internet Protocol ("IP") or any other network protocol. The transport layer can include Transport Control Protocol ("TCP"), User Datagram Protocol ("UDP"), or any other transport protocol. The session layer can include Hypertext Transport Protocol ("HTTP"), File Transfer Protocol ("FTP"), Simple Network Management Protocol ("SNMP"), Desktop Management Interface ("DMI") or any other session protocol. Merely by way of example, FIG. 1 shows first and second managed computers 12 and 14 connected to a first Ethernet LAN 20, and third and fourth managed computers 16 and 18 connected to a second Ethernet LAN 22. The first and second LANs 20 and 22 are connected to the World Wide Web 24 via first and second routers 26 and 28.

Also connected to the World Wide Web 24 is a network manager 30 for remotely monitoring and controlling resources associated with the first and second LANs 20 and 22. The network manager 30 can be in the same physical location as the first and second LANs 20 and 22 or it can be at a remote location. By way of example, FIG. 1 shows a remotely-located network manager 30 that is connected to the Web 24 by a third router 32 and a third Ethernet LAN 34. However, the network manager 30 could be connected to the Web 24 by other means, such as a modem.

A human system administrator logs onto the network manager 30 and runs a web browser such as Microsoft Internet Explorer, Netscape Navigator or other HTML browser. The web browser accesses one or more HTML files that instruct the network manager 30 to manage the network. In such an instance, the network manager 30 would communicate with the computers 12, 14, 16 and 18 using TCP/IP and HTTP communication protocols.

The HTML files instruct the network manager 30 to perform typical monitoring and control functions such as automatically monitoring the status and health of the managed resources. For example, the network manager 30 sends predefined queries to the managed computers 12, 14, 16 and 18, which return data about their resources (e.g., cpu utilization) that need to be monitored. The network manager 30 also receives events sent by the managed computers 12, 14, 16 and 18 when thresholds are exceeded and abnormal conditions are detected in the managed computers 12, 14, 16 and 18.

To make information about the resources accessible to the system administrator, the network manager 30 can display graphical representations of the resources. For example, the network manager 30 might display graphical representations of the computers 12, 14, 16 and 18, the Ethernet LANs 20, 22 and 34, and the routers 26, 28 and 32. The graphical representations might be color-coded to indicate resource status.

The HTML files instruct the network manager 30 to perform additional network management functions that are not typical. For example, the network manager 30 can retrieve information from a computer that has crashed. Having retrieved the information, the network manager 30 can then diagnose why the computer has crashed. The network manager 30 can then remotely reboot the computer that has crashed. The network manager 30 can also remotely power down a computer at a scheduled time and power up the computer at a later scheduled time. For example, the network manager 30 can remotely power down an inactive computer at the close of business and restart the computer at the beginning of business the next day. The network manager 30 can also automatically perform firmware updates such as BIOS updates. It can also control computer resources such as fan controllers and memory controllers.

These additional functions can be performed because each computer 12, 14, 16 and 18 includes an integrated LAN controller and web server chip. The integrated chip includes a manageability web server, that is a web server that runs independently of the computer host processor, gathers management information for the network manager 30 and communicates with the network manager 30 over the network. Because the manageability web server runs independently of the host processor, the network manager 30 can access information from the web server, even if the computer has crashed. Moreover, the chip can communicate with devices such as power supply controllers, memory controllers and fan controllers, and it allows network management and local area network communications to be performed over a single physical interface.

Each computer 12, 14, 16 and 18 is assigned two IP addresses: one for the manageability web server, the other for the computer's host processor. Each computer 12, 14, 16 and 18 is also assigned two unique MAC or physical addresses: one for the manageability web server, the other for the host processor.

Consider the fourth computer 18. Packets sent by the network manger 30 to the manageability web server of the fourth computer 18 include the IP address of the manageability web server. The packets including the IP address of the manageability web server might also include a predefined query for specific information about a resource on the fourth computer 18. Packets sent by the second computer 14 to the fourth computer 18 include the IP address of the host processor of the fourth computer 18. The packets including the IP address of the host processor might also include an e-mail message from the second computer 14.

When a packet reaches the second router 28, the second router 28 and the fourth computer 18 cooperate to resolve the IP address into a MAC address. If the packet includes the IP address of the manageability web server, the IP address is resolved into the unique MAC address for the manageability web server. If the packet includes the IP address of the host processor, the IP address is resolved into the unique MAC address for the host processor. The second router 28 adds the MAC address to the packet and places the resulting frame onto the second LAN 22.

Figure 2:
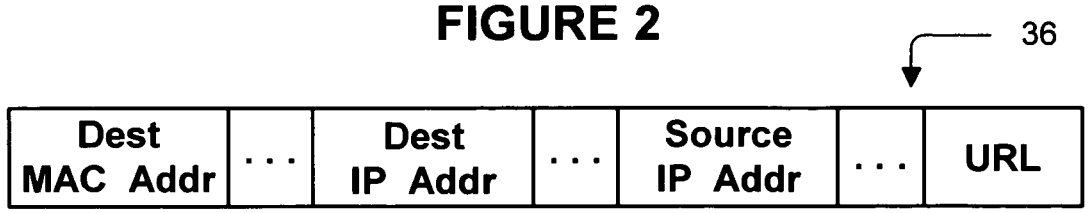
FIG. 2 is a representation of a portion of a frame sent to the integrated LAN controller and web server chip.

Portions of a frame 36 are shown in FIG. 2. The frame 36 includes a destination MAC address, a source IP address, a destination IP address, and a web URL indicating the object to be queried or the action to be taken.

Figure 3:
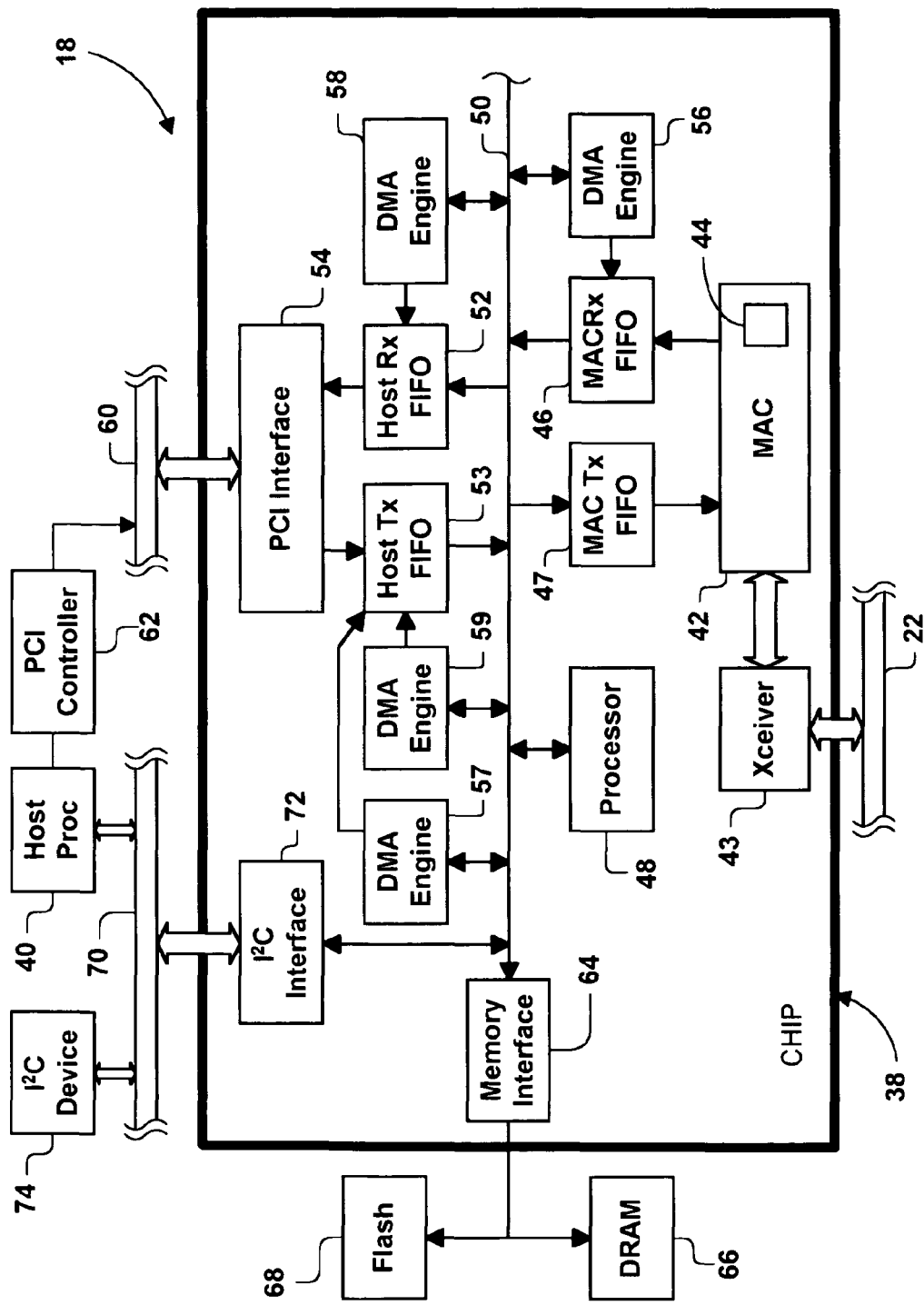
FIG. 3 is a block diagram of an integrated LAN controller and manageability web server chip for a computer forming a part of the system shown in FIG. 1.

FIG. 3 shows an integrated LAN controller and web server chip for the fourth computer 18. The chip is identified by reference numeral 38 and will hereinafter be referred to as the "chip 38." Functioning as the LAN controller, the chip 38 handles communications between the fourth computer's host processor 40 and the second Ethernet LAN 22. Functioning as the manageability web server, the chip 38 allows the network manager 30 to control and monitor the fourth computer 18.

The chip 38 includes a media access controller 42 and a transceiver 43 that allows the media access controller 42 to communicate bi-directionally with the second LAN 22. The media access controller 42 receives the frames from the second LAN 22. The media access controller 42 includes an address filter 44 that is designed to accept packets of frames including either of two unique destination MAC addresses assigned to the fourth computer 18: either the destination MAC address of the manageability web server, or the destination MAC address of the host processor 40. The address filter 44 can include register memory containing the two unique destination MAC addresses assigned to the fourth computer 18. When a MAC destination address in a frame matches one of the addresses in the registers, packets in the frame are accepted. The address filter 44 might also include registers for allowing certain multicasted and broadcasted packets to be accepted by the media access controller 42. For a 10/100T Ethernet, the media access controller 42 could be an 802.3 MAC A/B engine. The transceiver 43 could be located on the chip 38 (as shown in FIG. 3) or it could be located off the chip.

The media access controller 42 temporarily stores the accepted packets in a MAC Receive First-In, First-Out ("FIFO") buffer 46. The media access controller 42 also stores the MAC address in the MAC Receive buffer 46.

An embedded processor 48 determines (via polling) or is notified (via an interrupt) that data is being stored in the MAC Receive buffer 46. The embedded processor 48 reads the destination MAC address in the MAC Receive buffer 46 as the packet is being buffered. The embedded processor 48 also determines a destination route before the entire packet is buffered. Reading the destination MAC address of the packet and determining a destination route before an entire packet is buffered cuts down on latency of getting the packet to its endpoint. A packet has a typical length of 64 bytes and a maximum length of 1512 bytes. The header is only about 48 bytes. Thus, communication speed is increased because the chip 38 doesn't wait for an entire packet to be buffered before starting to send the buffered packet to its endpoint.

Packets accepted by the media access controller 42 and addressed to the host processor 40 are routed to a PCI interface 54 as follows. The embedded processor 48 instructs a first DMA engine 56, which controls the MAC Receive buffer 46, to send the buffered packets from the MAC Receive buffer 46 to a Host Receive FIFO buffer 52. The MAC Receive buffer 46 places the packets and a destination address on a data bus 50. A Host Receive buffer 52 decodes the destination address and accepts the packets. The embedded processor 48, having been notified that data is being stored in the Host Receive buffer 52, writes instructions to a second DMA engine 58, which controls the Host Receive buffer 52. The second DMA engine 58 sends the buffered packets from the Host Receive buffer 52 to a destination PCI address. The PCI Interface 54 is connected to a PCI bus 60 of the fourth computer 18. A PCI controller 62 is also connected to the PCI bus 60. The PCI interface 54 decodes the destination address and notifies the PCI controller 62, which accepts the packets on the PCI bus 56. The PCI controller 62 sends the packets to host processor 40 memory.

Packets accepted by the media access controller 42 and addressed to the manageability web server are routed as follows. The embedded processor 48 instructs the first DMA engine 56 to send data from the MAC Receive buffer 46 to a DRAM 66. The MAC Receive buffer 46 places the packets and a destination address on the data bus 50. A memory interface 64 decodes the destination address and stores the packets in the DRAM 66.

Broadcasted and multicasted packets accepted by the media access controller 42 can be sent concurrently to the host processor 40 memory and the manageability web server. The embedded processor 48 recognizes a multicast or broadcast address of the buffered packet, and instructs the first DMA engine 56 to place the buffered packets on the data bus 50 along with a single destination address. The memory interface 64 decodes the destination address and stores the packets in the DRAM 66, and the Host Receive buffer 52 decodes the destination address and buffers the packets. The embedded processor 48 then instructs the second DMA engine 58 to send packets from the Host Receive buffer 52 to the PCI Interface 54.

Packets generated by the host processor 40 and addressed to the web server or a network device are handled as follows. The host processor 40 notifies the embedded processor 48 that a packet is to be read from PCI address space. The notification could be achieved via an interrupt or polling (wherein the chip periodically checks a memory location in the PCI address space to determine if a packet is to be sent out). In response to the notification, the embedded processor 48 instructs a third DMA Engine 57 to transfer data from the PCI address space to the Host Transmit Buffer 53. The data includes a packet and a destination MAC address. As the destination MAC address is being buffered in the Host Transmit buffer 53, the embedded processor 48 is interrupted. The embedded processor 48 reads the destination MAC address and determines whether the packet should be forwarded to the web server or a device on the network.

Here too, the embedded processor 48 determines a destination route before an entire packet is buffered. This time, the embedded processor 48 determines the destination route while a packet is being buffered in the Host Transmit buffer 53. The latency of getting the packet to either the web server or the network device is reduced.

If the packet generated by the host processor 40 is addressed to the network manager 30 or another device on the network, the embedded processor 48 instructs a fourth DMA Engine 59 to forward the packet to the MAC Transmit buffer 47. The fourth DMA engine 59 places the buffered packet and a destination address on the data bus 50. The MAC Transmit buffer 47 decodes the destination address and buffers the packet. The media access controller 42 reads the packet buffered in the MAC transmit buffer 47 and the transceiver 43 places the buffered packets on the second LAN 22.

If the packet generated by the host processor 40 is addressed to the web server, the embedded processor 48 instructs the fourth DMA Engine 59 to forward the packet to the DRAM 66. The fourth DMA engine 59 places the buffered packet and a destination address on the data bus 50. The memory interface 64 decodes the destination address and stores the packet in the DRAM 66.

Thus, the host processor 40 can send packets directly to the web server without going onto the second LAN 22. Similarly, the web server can send packets directly to the host processor 40 without going onto the second LAN 22. The embedded processor 48 places the packets and a destination address on the data bus 50, and the Host Receive buffer 52 decodes the destination address and accepts the packets. The embedded processor 48 then instructs the second DMA engine 58 to send the buffered packets from the Host Receive buffer 52 to a destination PCI address. The PCI interface 54 decodes the destination address and notifies the PCI controller 62, which accepts the packets on the PCI bus 56. The PCI controller 62 sends the packets to the host processor 40 memory.

The embedded processor 48 can also send packets to the network manager 30 and other devices on the network. The embedded processor 48 places a packet and a destination address on the data bus 50. The MAC Transmit buffer 47 decodes the destination address and buffers the packet. The media access controller 42 and the transceiver 43 place the buffered packets on the second LAN 22.

The host processor 40 and the embedded processor 48 can also broadcast and multicast packets. As with the broadcasts and multicasts received from the network, a single destination address is placed on the data bus 50. The bus design, decoding logic and address map of the chip 38 facilitates a single transfer.

When performing manageability web server functions, the embedded processor 48 gathers manageability information about the fourth computer 18 and stores the manageability information in a DRAM 66. The manageability information might include temperatures, power levels, host processor utilization, etc. The embedded processor 48 also responds to packets including predefined queries from the network manager 30 and downloads web page content in response to the queries. The web page content might include one or more HTML files that display the manageability information in a web page format. If the network manager 30 sends a query including the URL of the web page HTML file, the embedded processor 48 responds by generating packets including the web page HTML file and the destination IP address of the network manager 30. The packets are downloaded to the network manager 30.

If the network manager 30 sends a query including a URL and a query string requesting specific information, the embedded processor 48 might access the requested information from the DRAM, generate packets including the requested information and download the requested information to the network manager 30.

The web page content does not have to be static; it could be dynamic. The embedded processor 48 could be programmed to push the manageability information to the network manager 30. For example, the embedded processor 48 could send a new packet including a value for cpu utilization to the network manager 30 every time that cpu utilization changes. Thus, information displayed by the network manager 30 could be updated dynamically and automatically.

The web page content is stored in Flash memory 68. An operating system and a server program (that is, executable instructions for instructing the embedded processor 48 to function as a web server and a LAN controller) are also stored in Flash memory 68. The operating system is an embedded real-time operating system. A web server program that instructs the embedded processor 48 to function as an HTTP server would, among other things, instruct the embedded processor 48 to run a TCP/IP stack. If the web server program is coded in the Java programming language, the Flash memory 68 would also store instructions for a Java Virtual Machine.

The embedded processor 48 is capable of running the code (e.g., the operating system, the web server program) in the Flash memory 68 and keeping up with the network bandwidth. If the web server program is coded in the Java programming language, the embedded processor 48 is also capable of keeping up with the Java Virtual Machine.

The manageability information can come from different sources. One source of the manageability information can come from the host processor 40. For example, the embedded processor 48 might be programmed to periodically query the host processor 40 for cpu utilization information. The embedded processor 48 would send a query to the Host Receive Buffer 52, and it would read a value including cpu utilization from the Host Transmit buffer 53.

Another source of manageability information comes by way of an Inter Integrated Circuit ($I^2C$) bus 70. The $I^2C$ bus 70 is a low bandwidth, serial bus interface. The original specification for the $I^2C$ Interface Bus 70 was written in 1992. An update to the $I^2C$ specification in 1995 expanded the address space and allowed for faster operation. A driver that allows the embedded processor 48 to communicate over the $I^2C$ bus is stored in the Flash memory 68.

The $I^2C$ bus 70 is connected between an $I^2C$ interface 72 on the chip 38 and different $I^2C$-compliant devices 74 of the fourth computer 18. The $I^2C$-compliant devices 74 might include fan controllers, sensors and power supply controllers. Other $I^2C$-compliant devices 74 might include display LCDs or indicators, memory controllers, bus bridges, memory SIMMs, graphics cards and disk drives.

Each $I^2C$-compliant device 74 includes an $I^2C$ interface and registers that can be read from and written to across the $I^2C$ bus 70. Performing the manageability functions is simply a matter of writing to or reading from the appropriate addresses. An $I^2C$ transaction can be handled in a number of different ways. As a slave, an $I^2C$ compliant device 72 responds and acknowledges when its address is requested on the $I^2C$ bus 70. However, any slave may slow down the transaction to as slow as necessary. $I^2C$ interrupts can be handled as polled handshakes on the device side (as opposed to the $I^2C$ side of the interface) or they can be asynchronous.

The $I^2C$ bus 70 allows the embedded processor 48 to obtain manageability information related to the $I^2C$-compliant devices 72. Such information might include fan speed and computer temperature. In addition to monitoring fan speed and computer temperature, the $I^2C$ bus 70 also allows the embedded processor 48 to determine the state of other $I^2C$-compliant devices 72 in the computer 18 (e.g., registers) in the case of a crash. This is useful for debugging and diagnostic purposes because it is difficult to obtain this information in a crashed system.

Not only does the $I^2C$ bus 70 allow manageability information to be obtained, but it also allows certain $I^2C$-compliant devices 74 to be controlled. For example, the $I^2C$ bus 70 allows the embedded processor 48 to control fan speed, power the system on and off, and send the information to the network manager 30 for display.

The $I^2C$ bus 70 is also connected to the host processor 40. Typically, the embedded processor 48 and the host processor 40 will not communicate with each other over the $I^2C$ bus 70. Throughput is too low and latency is too high (any device 72 holding down the $I^2C$ bus 70 will slow communications). Instead, the embedded processor 48 and the host processor 40 will typically communicate with each other over the PCI bus 60. The $I^2C$ bus 70 is best used for device control where millisecond precision is not needed.

Because the embedded processor 48 operates independently of the host processor 40, it can gather certain manageability information over the $I^2C$ bus 70 and it can retrieve certain manageability information from the DRAM 66, even if the fourth computer 18 crashes. Additionally, the embedded processor 48 can control certain computer functions, such as powering down or rebooting the fourth computer 18, even if the fourth computer 18 crashes.

The chip 38 could be fabricated as an ASIC. The ASIC could be mounted to a motherboard of the fourth computer 18, or it could be mounted to a card that is connectable to a PCI slot on the motherboard. Although the chip 38 was described in connection with the fourth computer 18, it is understood that each other managed computer 12, 14 and 16 can also include a chip 38, a host processor 40, a PCI bus 60, a PCI controller 62, DRAM 66, Flash memory 68, an I²C bus 70 and I²C-compliant devices 72.

Figure 4:
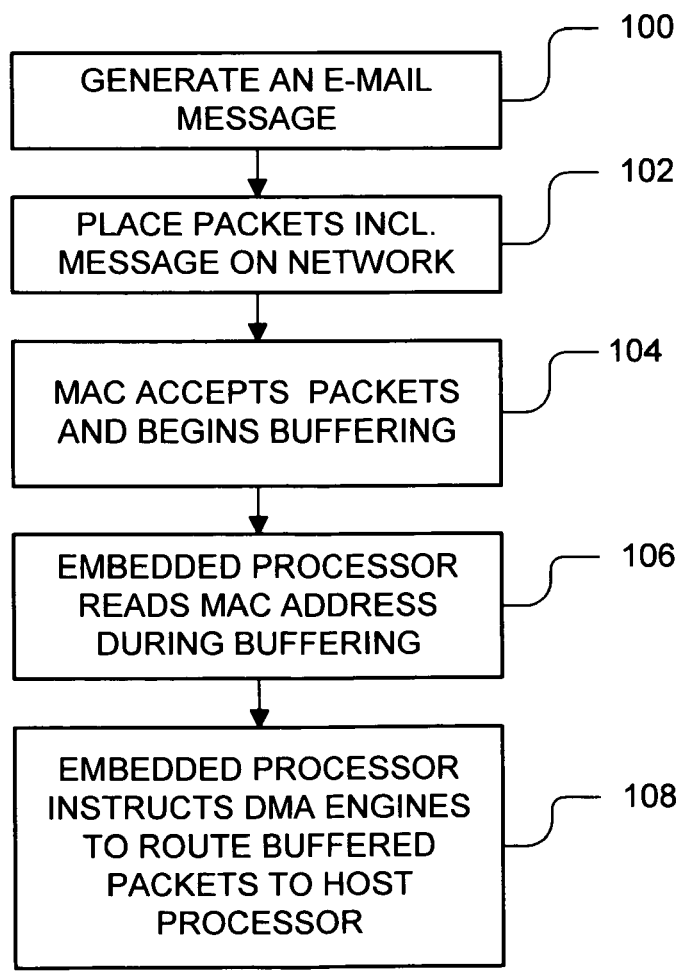
FIG. 4 is a flowchart of steps during which a communication is sent to the computer including the integrated LAN controller and web server chip.

FIG. 4 shows an example of sending an e-mail message to the fourth computer 18. An e-mail message addressed to the host processor 40 is generated (step 100) and packets including the message are placed on the network (step 102). Each packet includes the IP address of the host processor 40. Eventually the packets arrive at the second router 28, which resolves the IP address into a MAC address of the host processor 40 and places frames including the host processor MAC address on the second LAN 22.

The media access controller 42 of the fourth computer 18 accepts those frames including the MAC address of the host processor 40 and begins buffering the packets in the MAC Receive buffer 46 (step 104). The embedded processor 48 is notified that packets are being buffered and begins reading the MAC address of the packets being buffered (step 106). Since the MAC address corresponds to the host processor 40, the buffered packets are sent to the PCI Interface 54 while other packets are still being buffered in the MAC Receive buffer 46 (step 108). The packets including the e-mail message are received by the host processor 40.

The frame might indicate that the e-mail message is to be multicasted to the embedded processor 48. If multicasting is requested, the e-mail message can be routed simultaneously to the embedded processor 48.

Figure 5:
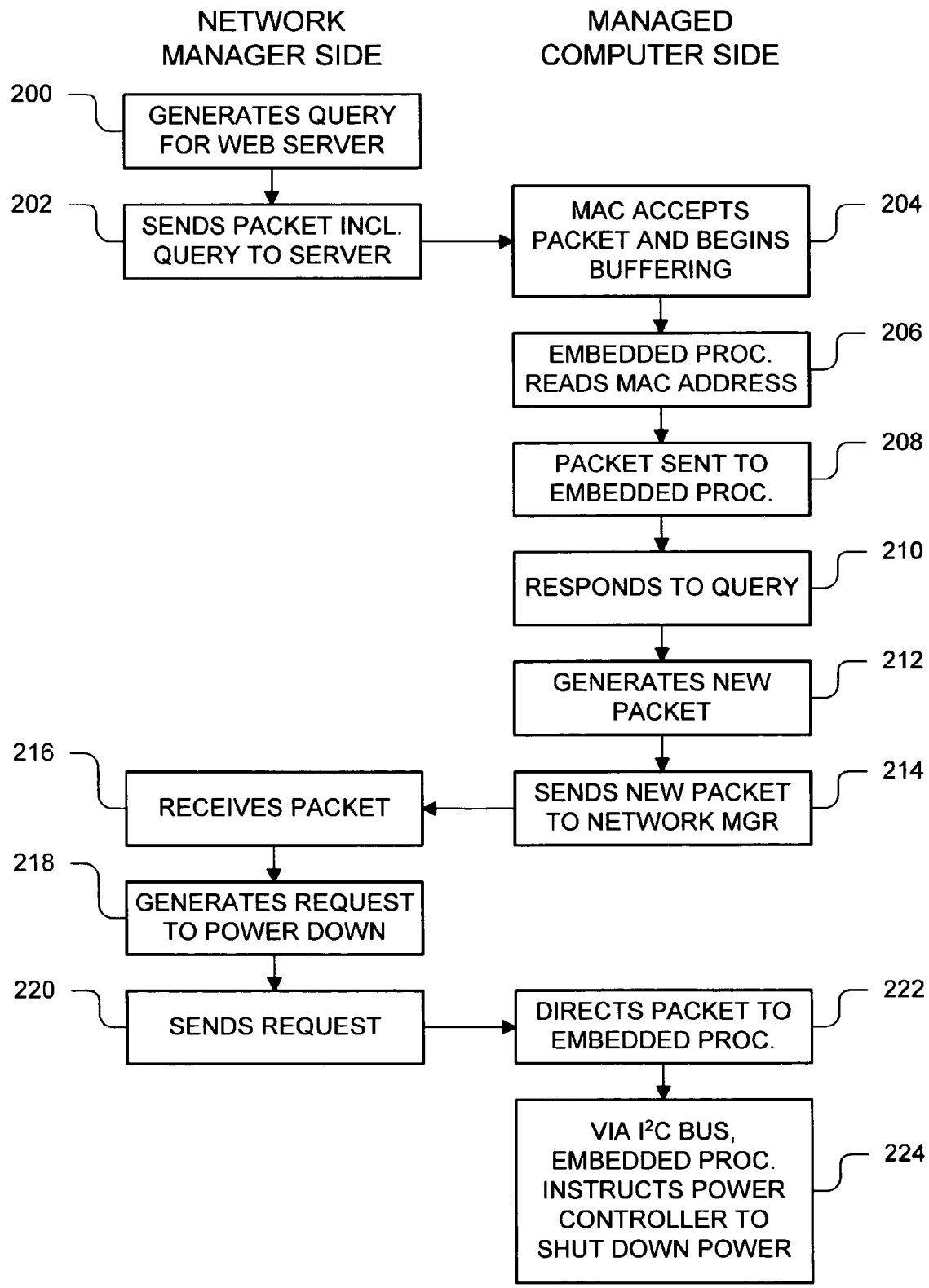
FIG. 5 is a flowchart of a first example of managing the computer including the integrated LAN controller and web server chip.

FIG. 5 shows an example of managing the fourth computer 18. The network manager 30 generates a query for cpu utilization and addresses the query to the manageability web server of the fourth computer 18 (step 200). Packets including the query and the IP address of the manageability web server are sent over the World Wide Web 24 (step 202). Eventually the packets arrive at the second router 28, which resolves the IP address of the manageability web server into a MAC address and places frames including the packets and the second MAC address on the second LAN 22.

The media access controller 42 of the fourth computer 18 accepts those frames including the MAC address for the manageability web server and begins buffering the packets (step 204). The embedded processor 48 is notified that packets are being buffered and begins reading the MAC address of the packets being buffered (step 206). Since the MAC address corresponds to the manageability web server, the buffered packets are sent to the embedded processor 48 (step 208).

The embedded processor 48 responds to the query for cpu utilization (step 210). The embedded processor 48 might access the manageability information already stored in the Flash memory 68, or it might communicate directly with the host processor 40 to obtain new information regarding cpu utilization. Once the information regarding cpu utilization has been obtained, the embedded processor 48 generates a packet including the requested information and the IP address of the network manager 30 (step 212). The packet addressed to the network manager 30 is buffered in the MAC Transmit buffer 47 and placed on the second LAN 22 by the media access controller 42 and the transceiver 43 (step 214). After traveling over a path including the second LAN 22, the second router 28, the World Wide Web 24, the third router 32 and the third LAN 34, a frame including the requested information reaches the network manager 30.

The network manager 30 receives the frame (step 216). If, for example, cpu utilization indicates that the fourth computer 18 has been inactive for a while (perhaps the user went home for the evening or went on a business trip), the network manager 30 generates a packet including a request for the fourth computer 18 to power down (step 218). The packet is sent to the World Wide Web 24 (step 220).

Eventually, a frame including the packet reaches the media access controller 42 of the fourth computer 18. The packet is buffered and directed to the embedded processor 48 (step 222). The embedded processor 48 responds to the packet by writing, via the I²C bus 70, to a register in an I²C-compliant power supply controller 74 (step 224). In response, the I²C-compliant power supply controller 74 shuts down the fourth computer 18.

Figure 6:
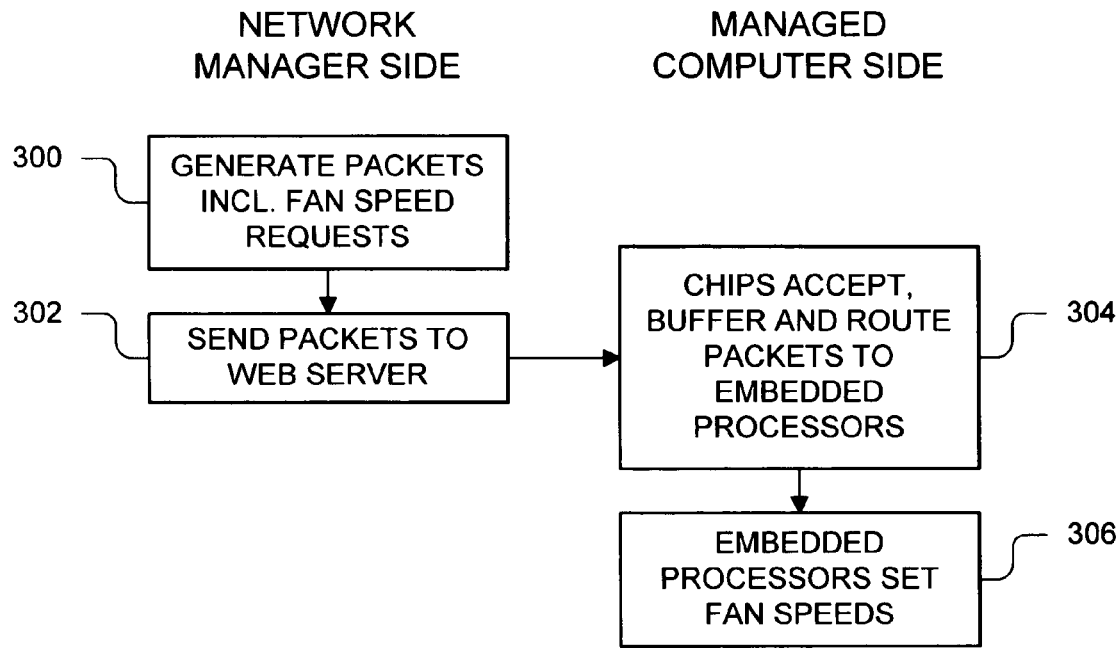
FIG. 6 is a flowchart of a second example of managing the computer including the integrated LAN controller and web server chip.

FIG. 6 shows an example of managing fan speeds of the second computer 14 and the fourth computer 18. Assume the second computer 14 is located in an environment where noise is not a concern, but the fourth computer 18 is located in a quiet zone. The network manager 30 can run the fan of the second computer 14 at higher (and noisier) fan speed than the fan of the fourth computer 18. Therefore, the network manager 30 generates and sends first and second packets to the Web 24 (blocks 300 and 302). The first packet includes an IP address of the web manageability server of the second computer 14 and a request to operate the fan of the second computer 14 at a first speed. The second packet includes an IP address of the web manageability server of the fourth computer 18 and a request to operate the fan of the fourth computer 18 at a second, lower speed.

The chips 38 of the first and second computers 14 and 18 receive, accept, buffer, and route their respective packets (block 304). The embedded processor 48 of each chip 38 writes, via an I²C bus 70, the requested fan speed to the I²C register of an I²C-compliant fan controller 74 (block 306). In response, the I²C-compliant fan controllers 74 of the second and fourth computers 14 and 18 operate their fans at the requested speeds.

Figure 7:
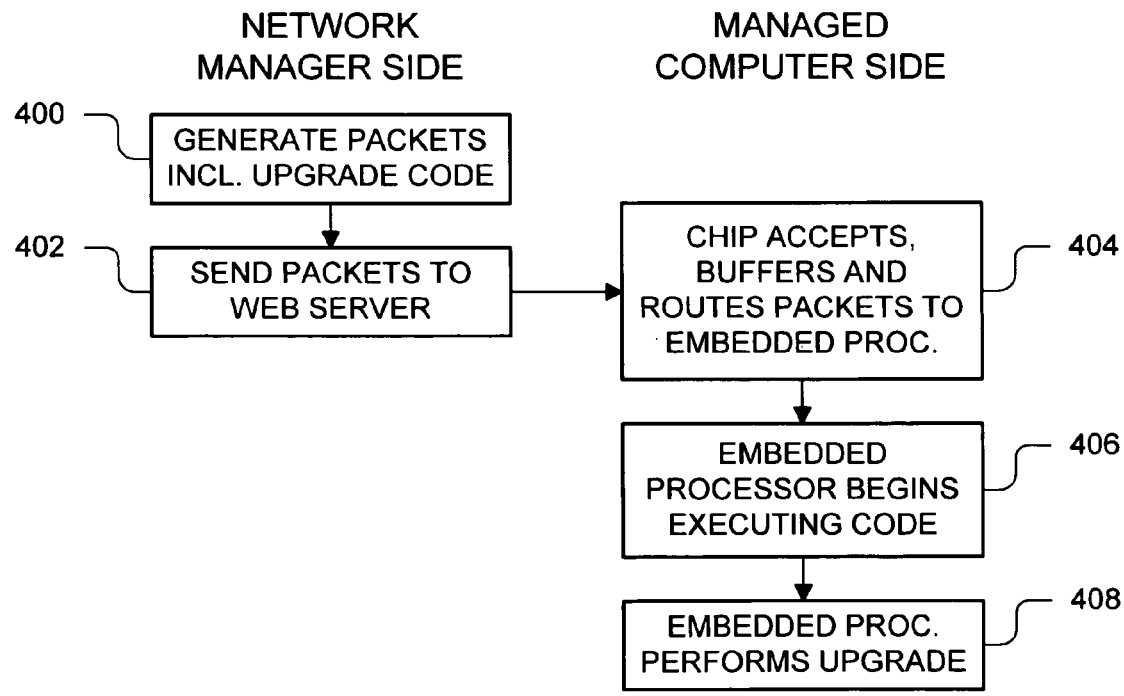
FIG. 7 is a flowchart of an example of automatically performing an upgrade on the computer including the integrated LAN controller and web server chip.

FIG. 7 shows a method of automatically performing an upgrade of the BIOS of the fourth computer 18. The BIOS is typically stored in an EEPROM mounted on the motherboard of the fourth computer 18. The network manager 30 generates packets including code for performing the BIOS upgrade of the fourth computer 18 (block 400). The packets are addressed to the manageability web server. The network manager 30 sends the packets to the manageability web server (block 402). The chip 38 accepts, buffers and routes the packets to the embedded processor 48 (block 404), which begins executing the code (block 406). The embedded processor 48, via either the I²C bus 70 or the PCI bus 60, performs the upgrade by programming a new BIOS into the BIOS EEPROM (block 408).

Figure 8:
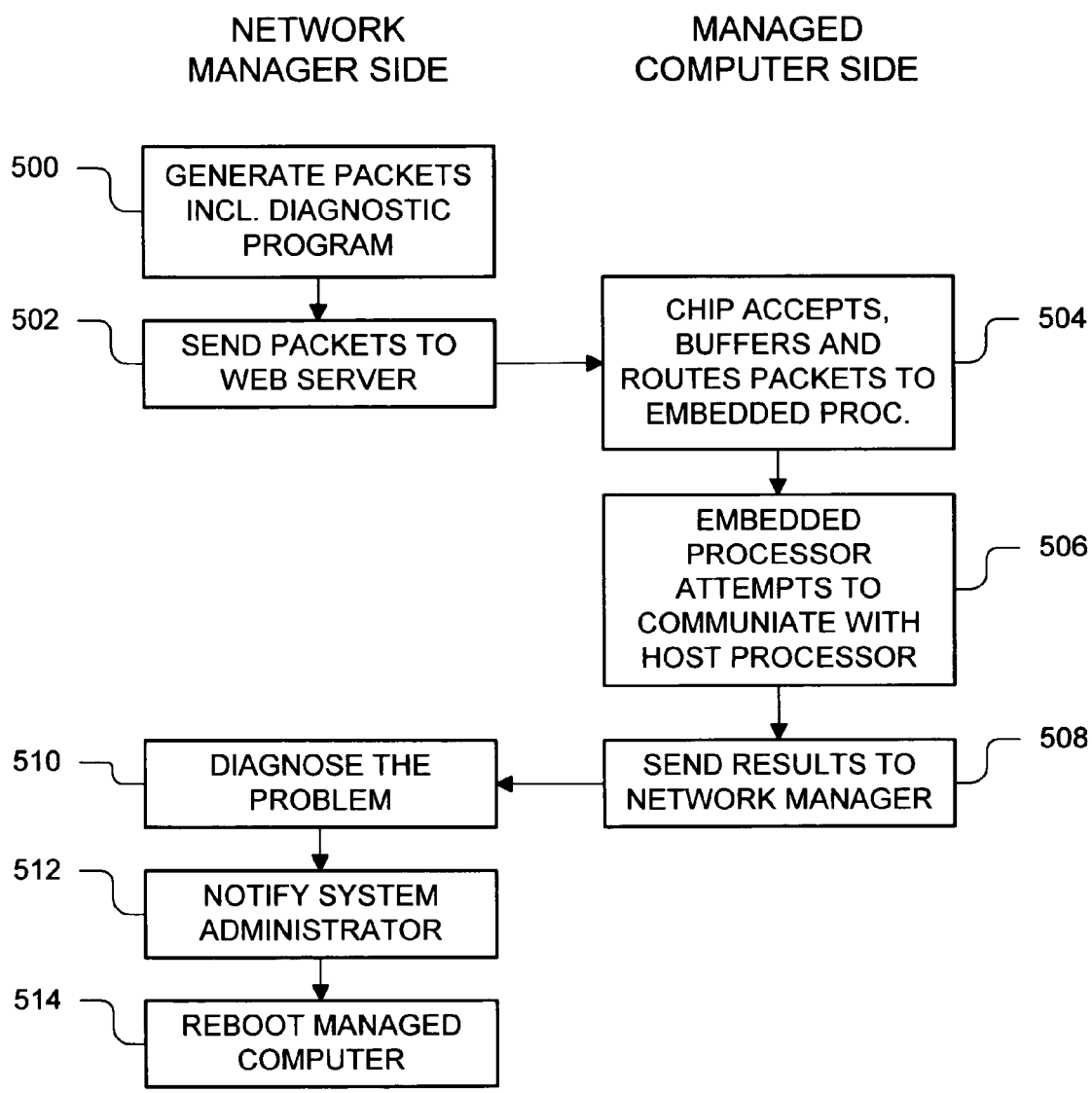
FIG. 8 is a flowchart of an example of performing diagnostics on the computer including the integrated LAN controller and web server chip.

FIG. 8 shows a method of performing diagnostics on the fourth computer 18 when the fourth computer 18 is not communicating with the network manager 30. The network manager 30 generates and sends packets including a diagnostic program to the manageability web server of the fourth computer 18 (blocks 500 and 502). The chip 38 receives, accepts, buffers and routes the packets to the embedded processor 48 (block 504), which executes the diagnostic program. The diagnostic program instructs the embedded processor 48 to attempt to communicate with the host processor 40, first via the PCI bus 60 and then via the I²C bus 70 (block 506). The embedded processor 48 sends the results of these attempts and perhaps an image of memory (accessed via the I²C bus 70) to the network manager 30 (block 508).

The network manager 30 uses the information to diagnose the problem in the fourth computer 18 (block 510). If the embedded processor 48 can communicate with the host processor 40 via the I²C bus 70 but not over the PCI bus 60, the problem could be isolated to the PCI interface 54, the PCI bus 60 or the PCI controller 62. If the embedded processor 48 cannot communicate with the host processor 40 over either bus 60 or 70, the problem might be due to a system crash. The network manager 30 notifies the system administrator of a problem with the fourth computer 18 (block 512). If the problem is determined to be a system crash, the network manager 30 might also reboot the fourth computer 18 (block 514).

Thus disclosed is a chip 38 that includes the functionality of both a network controller and a manageability web server. Functioning as a network controller, the chip 38 allows network management and network communications to be performed over a single physical interface instead of two physical interfaces. Eliminating a physical interface for each managed computer lowers the cost of implementing the network management.

Additionally, the chip 38 facilitates direct communication between the host processor 40 and the web server. The web server does not have to go onto the network in order to communicate with the host processor 40, and vice versa.

Packets can be broadcasted or multicasted to the manageability web server and the host processor 40 without duplication of hardware resources since the packets on the data bus 50 are available to both web server and the host processor 40.

The DMA engines 56, 57, 58 and 59 reduce the processing burden on the embedded processor 48. The embedded processor 48 simply commands the DMA engine or engines 56, 57, 58 and 59 to perform I/O transfers.

Functioning as a web server, the chip 38 gathers information about other components in the managed computer without the need for agents. The embedded processor 48, not the host processor 40, responds to requests for manageability information from the network manager 30. Consequently, the chip 38 gathers manageability information without burdening the host processor 40 and placing overhead on the operating system.

Even if the operating system crashes, the chip 38 allows the network manager 30 to retrieve diagnostic information as to why the crash occurred. Via the I$^2$C bus 70, the chip 38 can retrieve diagnostic information from a hard drive, a graphics card, a memory controller, etc. Thus, service and maintenance costs (and, hence, the total cost of ownership) can be reduced.

Additionally, a crashed computer can be rebooted remotely. Crashes could be fixed without manual intervention.

A managed computer including the chip 38 can be remotely reconfigured. BIOS and other firmware upgrades can be performed automatically. The cost of maintaining and servicing the network can be reduced.

A managed computer including the chip 38 can be remotely powered up and powered down during periods of inactivity. The managed computer can be powered down between business hours and powered up during business hours. Electricity would be saved, and network operational costs would be reduced.

Other resources can be remotely controlled in a computer including the chip 38. Thus, computer temperatures can be remotely monitored and controlled by the network manager 30.

If the embedded processor 48 is programmed to function as an HTTP web server, the network manager 30 could use non-proprietary software including a web browser for performing network management. Proprietary software would include HTML files. If increased functionality is desired, Java applets could be added. In the alternative, a standalone program could be written in the Java programming language and executed by a web browser. This would allow the network manager software to be ported to any browser-enabled network manager and used in connection with any managed device including the chip 38. Making such use of existing infrastructure would also lower the cost of implementing the network management.

Another advantage of monitoring and controlling resources via HTTP is the flexibility of situating the network manager 30 at remote locations. The network manager 30 could be situated at any location having access to the World Wide Web 24.

Although specific embodiments of the invention have been described and illustrated, the invention is not limited to the specific forms or arrangements of parts so described and illustrated. For example, the invention is not limited to the centralized management architecture shown in FIG. 1. The invention could be applied to a decentralized management scheme, in which there are multiple top-level network managers. Or, the invention could be applied to a peer-to-peer SNA management system, in which one peer can access another peer. For example, one peer could reboot another peer.

The chip can be used in any platform. Thus, the first computer 12 shown in FIG. 1 could be a Macintosh, the second computer 14 could be a PC running a Windows-based operating system, and the third computer 16 could be an HP workstation running a Unix operating system.

Moreover, the chip is not necessarily limited to managed computers. Rather, the chip can be applied to any managed device. Therefore, a printer might include the chip. Printer communications would be routed to a host processor in the printer, and manageability communications from the network manager would be routed to the embedded processor on the chip.

The chip is not limited to the specific forms or arrangements of parts described and illustrated above. For example, the embedded processor could look at an IP address or it could look at a MAC address to determine the correct route for the packets. Content of the manageability information stored in Flash memory is dictated by the needs of the network manager and the resources offered by the managed device. The chip could be configured as a standalone manageability web server, without the integrated network controller. Such a chip might be connected to the I$^2$C bus, but not the PCI bus (therefore, such a chip might not include the Host buffers, the PCI interface and the first DMA engine).

Therefore, the invention is not limited to the specific forms or arrangements of parts so described and illustrated. Instead, the invention is limited only by the claims that follow.

What is claimed is:

1. A chip for incorporation within a network device connectable to a computer network, the network device including a host processor, the chip comprising:
   a media access controller connectable to the computer network, the media access controller providing the chip with access to the computer network independent of the host processor;
   a host interface connectable to the host processor; and
   an embedded processor coupled between the host interface and the media access controller;
   the embedded processor being programmable to function as a manageability web server, communicate with the host interface and obtain manageability information about the network device;
   the embedded processor further being programmable to send the manageability information to the media access controller for transmission over the computer network;
   whereby the chip performs network management functions independent of the host processor.

2. The chip of claim 1, wherein the embedded processor is programmable to obtain the manageability information in response to a network request addressed to the manageability web server.

3. The chip of claim 1, the network device further including an interchip communications means and a compliant device coupled to the interchip communication means, wherein the chip includes an interface connectable to the interchip communications means, and wherein the embedded processor is programmable to communicate via the interchip communication means interface to obtain manageability information about the compliant device.

4. The chip of claim 3, wherein the interchip communication means includes an I²C bus, and wherein the compliant device is an I²C-compliant device.

5. The chip of claim 3, wherein the embedded processor is also programmable to control the compliant device coupled to the interchip communications means.

6. The chip of claim 5, wherein the compliant device is a power supply controller, and wherein the embedded processor is programmable to control the power supply controller.

7. The chip of claim 5, wherein the compliant device is a fan controller, and wherein the embedded processor is programmable to control the fan controller.

8. The chip of claim 5, wherein the embedded processor is programmable to control the compliant device in response to a network request addressed to the manageability web server.

9. The chip of claim 5, wherein the embedded processor is programmable to perform firmware upgrades of the network device.

10. The chip of claim 1, wherein the embedded processor is programmable to perform network communications using TCP/IP.

11. The chip of claim 1, wherein the embedded processor is programmable to implement an HTTP web server.

12. The chip of claim 1, wherein the embedded processor is programmable to obtain manageability information from the host processor.

13. A network device connectable to a computer network, the network device comprising:
   interchip communications means;
   a compliant device coupled to the interchip communications means;
   a chip including a media access controller connectable to the computer network; an interchip communications interface connected to the interchip communications means; and an embedded processor coupled to the interchip communications interface and the media access controller; and
   non-volatile memory programmed with a plurality of executable instructions, the instructions, when executed, instructing the embedded processor to function as a manageability web server, communicate with the interchip communications means to obtain manageability information about the compliant device, and send the manageability information to the media access controller for transmission over the computer network.

14. The device of claim 13, further comprising volatile memory for storing the manageability information.

15. The device of claim 13, wherein the instructions instruct the embedded processor to perform network communications using TCP/IP.

16. The device of claim 13, wherein the instructions instruct the embedded processor to implement an HTTP web server.

17. The device of claim 13, wherein the non-volatile memory further stores web page content.

18. The network device of claim 13, wherein the instructions instructs the embedded processor to obtain the manageability information from the compliant device in response to network requests addressed to the manageability web server.

19. The network device of claim 13, further comprising a host processor; wherein the chip includes a host interface coupled to the host processor and the embedded processor, and wherein the instructions instruct the embedded processor to obtain manageability information from the host processor.

20. The network device of claim 13, wherein the interchip communications means includes an I²C bus, wherein the compliant device is an I²C-compliant device, and wherein the instructions instruct the embedded processor to control the I²C-compliant device in response to network requests addressed to the manageability web server.

21. The network device of claim 20, wherein the I²C-compliant device is a power supply controller, and wherein the instructions instruct the embedded processor to control the power supply controller.

22. The network device of claim 20, wherein the I²C-compliant device is a fan controller, and wherein the instructions instruct the embedded processor to control the fan controller.

23. A system comprising:
   a computer network;
   a network device including a host processor and a chip, the chip including
      a media access controller coupled to the computer network, and
      an embedded processor coupled to the media access controller and programmed to function as an HTTP manageability web server; and
   a network manager coupled to the computer network, the network manager including a web browser and a plurality of HTML files for instructing the network manager to communicate with the embedded processor in the network device and perform network management of the network device;
   whereby the embedded processor can communicate with the network manager independent of the host processor.

24. The system of claim 23, wherein the network device includes a compliant device and wherein the embedded processor is programmable to control the compliant device in response to control requests from the network manager.

25. The system of claim 24, wherein the compliant device is a power supply controller, and wherein the network manager can request the embedded processor to control the power supply controller to shut down and turn on the network device at scheduled times.

26. The system of claim 24, wherein the compliant device is a power supply controller, and wherein the network manager can request the embedded processor to control the power supply controller to reboot the computer.

27. The system of claim 24, wherein the network device further includes an upgradable BIOS; and wherein the network manager can send a BIOS upgrade program to the embedded processor and request the embedded processor to run the BIOS upgrade program.

28. The system of claim 24, wherein the network manager can send a diagnostic program to the embedded processor and request the embedded processor to run the diagnostic program and return to the network manager results obtained by the diagnostic program.

29. The system of claim 24, wherein the compliant device is a fan controller, and wherein the network manager can request the embedded processor to control the fan controller to adjust fan speed.

30. The system of claim 23, wherein the embedded processor is programmable to communicate with host interface and obtain manageability information from the host processor in response to requests by the network manager.

* * * * *

UNITED STATES PATENT AND TRADEMARK OFFICE
CERTIFICATE OF CORRECTION

PATENT NO. : 8,108,508 B1  Page 1 of 1
APPLICATION NO. : 09/102207
DATED : January 31, 2012
INVENTOR(S) : Dave Goh et al.

It is certified that error appears in the above-identified patent and that said Letters Patent is hereby corrected as shown below:

In column 13, line 61, in Claim 18, delete "instructs" and insert -- instruct --, therefor.

Signed and Sealed this
Thirtieth Day of October, 2012

David J. Kappos
*Director of the United States Patent and Trademark Office*